Nov. 8, 1966   K. L. CRABTREE   3,283,955
DISPENSING APPARATUS FOR NESTED ARTICLES
Filed Jan. 29, 1964   4 Sheets-Sheet 1

INVENTOR
*Kenneth L. Crabtree*

BY *Connolly and Hutz*
ATTORNEYS

Nov. 8, 1966  K. L. CRABTREE  3,283,955
DISPENSING APPARATUS FOR NESTED ARTICLES
Filed Jan. 29, 1964  4 Sheets-Sheet 2

INVENTOR
Kenneth L. Crabtree
BY Connolly and Hutz
ATTORNEYS

Nov. 8, 1966    K. L. CRABTREE    3,283,955
DISPENSING APPARATUS FOR NESTED ARTICLES
Filed Jan. 29, 1964    4 Sheets-Sheet 3
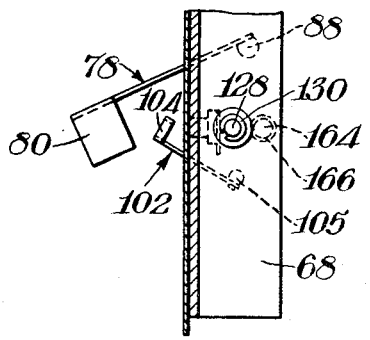
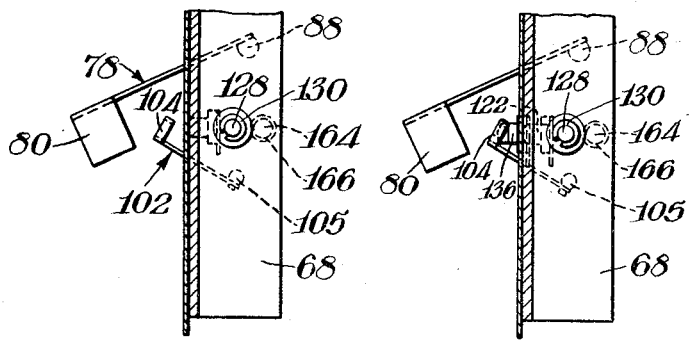
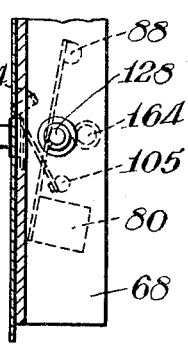
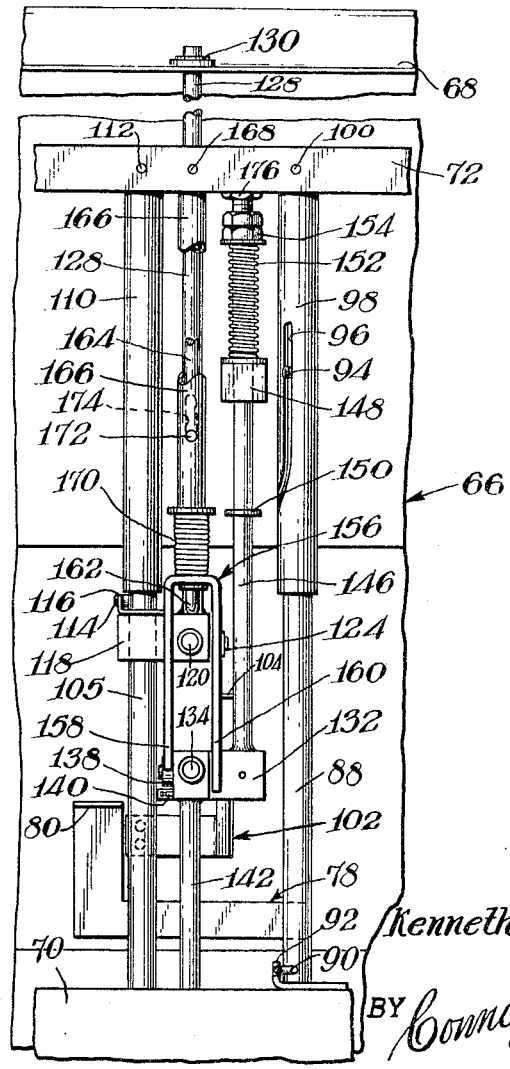
INVENTOR
Kenneth L. Crabtree
BY Connolly and Hutz
ATTORNEYS

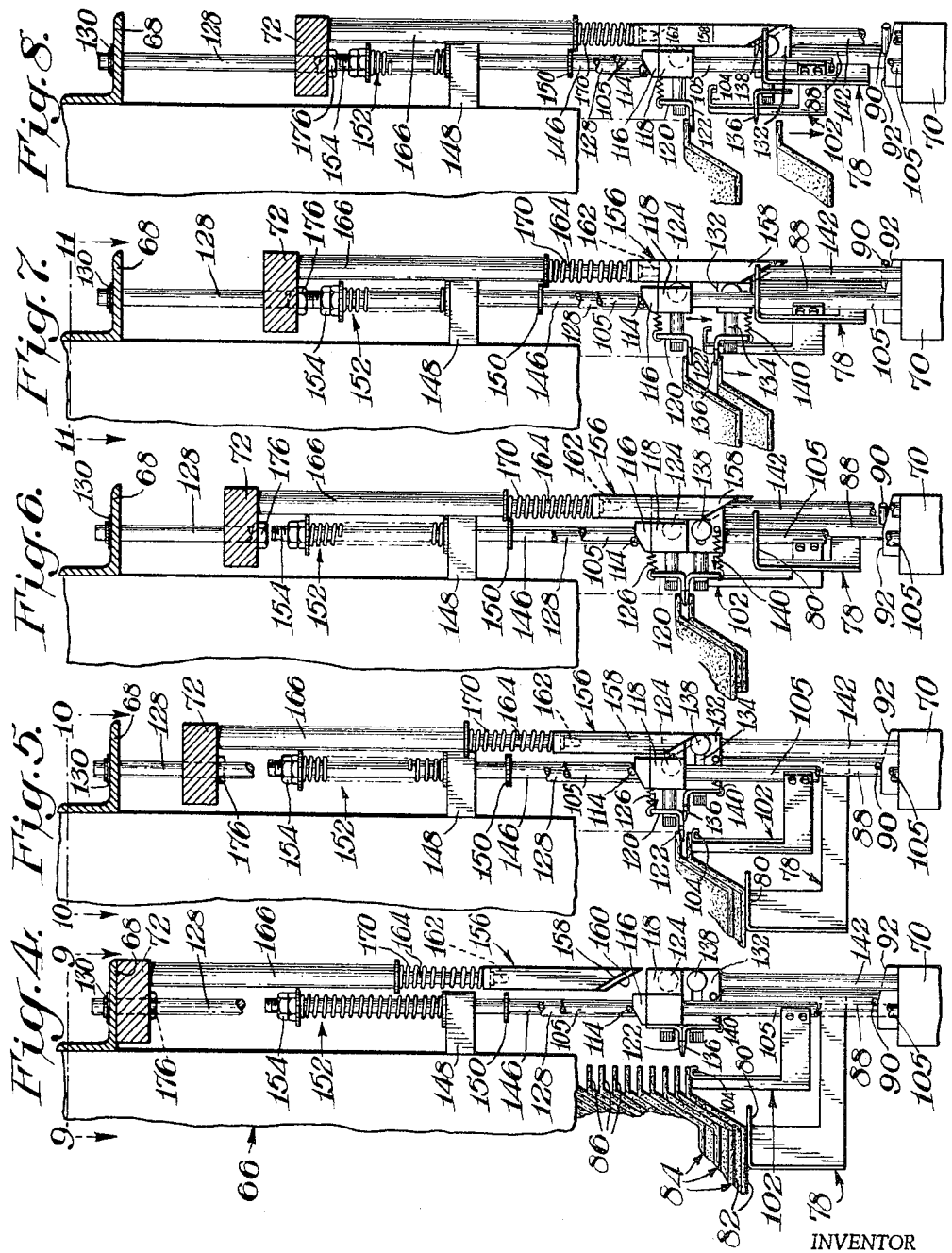

United States Patent Office 3,283,955
Patented Nov. 8, 1966

3,283,955
DISPENSING APPARATUS FOR NESTED ARTICLES
Kenneth L. Crabtree, Fairfield, Maine, assignor to Keyes Fibre Company, Portland, Maine, a corporation of Maine
Filed Jan. 29, 1964, Ser. No. 340,976
10 Claims. (Cl. 221—251)

This invention relates to dispensing method and apparatus for separating articles from a stack of similar articles, and more particularly to method and apparatus for properly engaging the rim portions of dish-shaped articles to dispense them singly from a nested stack thereof.

The increasing centralization of many high volume packaging operations has resulted in the growth of large and expensive automated packaging lines in which large quantities of packages are filled with various products prior to localized distribution. Moreover, packages such as egg cartons and filler-flats, fruit trays, vegetable and berry boxes and the like are being formed of materials such as molded pulp because of its desirable resiliency combined with strength, as well as other characteristics such as easy disposability and low initial cost. Such packaging articles are conveniently shipped from the molded pulp or other manufacturer to the centralized product packager in nested stacks.

The problem of rapidly separating large quantities of nested articles individually from stacks to feed an automated packaging line is intensified by the roughened surfaces of many materials such as molded pulp. Such surfaces are desirable as a cushioning feature for packaging fragile articles. The inherent frictional resistance of the roughened sides of molded pulp and other articles, however, causes them to cling together in a stack, and forcible separation of one article from another is required.

Prior attempts to separate or de-nest articles of material such as molded pulp singly from a stack thereof have not proved entirely satisfactory. While these proposals frequently include mechanism which adequately strips the articles from the stack, they have failed to overcome the problem of the inherent warpage or distortion frequently encountered in molded pulp articles. For instance, dish-shaped articles may be nested fairly uniformly; however, when such articles include flanged rim portions at their outer margins, the rim portions are frequently warped or distorted to the point where they are not evenly spaced from one another, even though the dished portions of the articles are generally uniformily nested. Consequently, prior de-nesting or dispensing apparatus encounters considerable difficulty in properly engaging the articles to be dispensed. Either the distorted rim of the article to be dispensed is missed entirely by the stripping mechanism, or the stripping mechanism engages the distorted rims of more articles than are desired to be dispensed. Such misalignment of the stripping mechanism with the flanged rim of the article to be dispensed not only causes malfunctioning and jamming of the dispensing apparatus, but results in considerable wastage due to torn or otherwise mutilated articles.

Accordingly, it is an object of the present invention to provide apparatus for dispensing articles from a stack of similar articles which are not necessarily uniformly spaced in the stack.

Another object of the present invention is to provide a method of dispensing articles from a stack of similar articles which are not necessarily uniformly spaced in the stack.

Another object of the present invention is to provide dispensing apparatus including means to detect the positional relationship of articles to be dispensed relative to a stack of such articles whereby stripping mechanism may properly engage the articles to be dispensed.

Other objects and advantages of the present invention will become apparent to one skilled in the art from a reading of the following description in conjunction with the accompanying drawings wherein similar reference characters refer to similar parts, and in which:

FIG. 3 is an elevational view similar to FIG. 2 showing the parts half way through one cycle of operation;

FIG. 4 is a sectional elevational view on line 4—4 of FIG. 2 with parts broken away for purposes of clarity showing the elements at the beginning of a cycle of operation;

FIG. 5 is a view similar to FIG. 4 showing the elements at a midpoint in the cycle of operation;

FIG. 6 is a view similar to FIG. 4 showing the elements at another midpoint in the cycle of operation;

FIG. 7 is a view similar to FIG. 4 showing the elements at another midpoint in the cycle of operation;

FIG. 8 is a view similar to FIG. 4 showing the elements at the half-way point of the cycle of operation;

FIG. 9 is a sectional plan view on line 9—9 of FIG. 4;

FIG. 10 is a sectional plan view on line 10—10 of FIG. 5; and

FIG. 11 is a sectional plan view on line 11—11 of FIG. 7.

Figure 1:
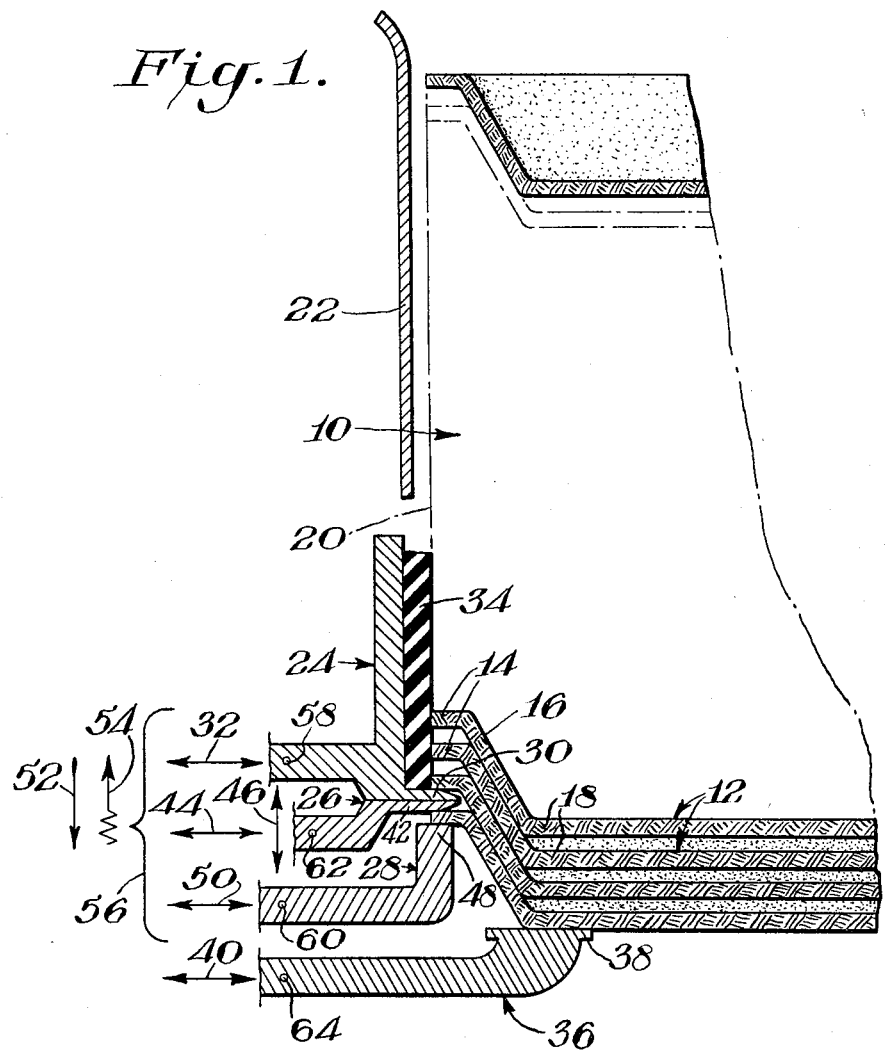
FIG. 1 is a schematic representation of the basic components involved with the practice of the method and apparatus of this invention.

Referring in more particularity to purely schematic FIG. 1, an exemplary stack 10 of articles comprises a plurality of generally similar articles 12 each having outwardly flaring rim portions 14 ordinarily defining their lateral margins. Depending from the rim portions 14 of the articles are dished portions having sloping side walls 16 and transverse bottom walls 18 so arranged that adjacent articles will stack in nested fashion with the side walls 16 in contact along a significant portion of their vertical extent. The articles when stacked in nested fashion have the outer extremities of their flaring rim portions 14 in generally straight alignment along a line 20 parallel with the central longitudinal axis of the stack, the line 20 defining the edge of the stack. With articles formed of material such as molded pulp, the mutually engaged wall portions 16 resist de-nesting or separation of one article from another due to the inherent surface friction of such material. Moreover, the warpage and distortion frequently encountered with molded pulp trays, boxes, cartons, filler-flats and the like cause the flexible rim portions 14 to vary in their spacing from one another in spite of substantially uniform nesting of the dished portions of the articles. Even though the rim portions are in generally straight longitudinal alignment, they are not necessarily uniformly spaced.

For dispensing such articles singly from one end of such a stack of nested articles, the method and apparatus of this invention contemplates means such as a guide rail 22 or other aligning device to hold the stack. In FIG. 1, only one side of the stack and only one dispensing mechanism are illustrated for purposes of clarity, and it will be understood that opposite sides of the stack may include identical dispensing mechanisms. With smaller articles, a pair of dispensing devices such as the one illustrated may be provided on each opposed lateral edge of the stack. On the other hand, with larger articles such as the extremely flexible molded pulp filler-flats for packaging egg cases, four or more such dispensing mechanisms may be provided, one on each of the four sides of the stack or two on a pair of opposed sides. Since each of the sets of dispensing apparatus are generally similar, a description of one discloses all. Similarly, the fact that the stack is shown vertically positioned to take advantage of gravity as a force for motivating it axially is not to be considered the only orientation and motivation possible according to the concepts of this invention.

Very broadly speaking, the dispensing apparatus includes at least the following operating mechanism. Retaining means 24 is positioned for movement laterally of the stack for the purpose of retaining the balance of the stack in fixed relation to the holding means 22 while articles are being dispensed from one end of the stack. Stripping means 26 mounted for movement laterally of the stack as well as for longitudinal stripping motion is provided for coacting with articles to be dispensed from the stack and for overcoming the inherent frictional resistance encountered with nested articles to dispense them away from the retained balance of the stack. Finally, sensing means 28 mounted for lateral shifting motion relative to the stack as well as longitudinal sensing motion is provided to detect the position of the articles in the zone in which the stripping means is to coact with the articles. As explained in more detail below, the broad sequence of operation may briefly be outlined as follows.

First, the sensing means 28 is shifted by yieldable motivating means until a portion of the article to be dispensed is detected. For instance, if articles are to be dispensed singly from the stack 10, the sensing means 28 moves longitudinally toward the stack until the leading surface of the rim portion 14 of the end article in the stack is encountered. Longitudinal motion of the sensing means is stopped by the encounter with the article rim. At this point, the stripping means 26 shifts laterally inward toward the stack to coact with the article to be dispensed. This movement is in response to the longitudinal position of the sensing means. For instance, if the stripping means comprises an element which engages between the article to be stripped and the balance of the stack, the element engages the trailing portion of the rim 14 of the end article in the stack. Meanwhile, the stack retaining means 24 engages the balance of the stack by shifting laterally into engagement therewith to retain the stack relative to the holding means 22 while the end article is being dispensed. Next, the sensing means 28 is retracted laterally from the longitudinal path which the dispensed article will follow during the stripping motion. This clears the way for the stripping means 26 to move the end article longitudinally away from the balance of the stack. After the end article has been removed from the stack 10, the stripping means 26 is retracted laterally beyond the edge 20 of the stack while the sensing means 28 is returned to its sensing position laterally inwardly of the edge 20 of the stack. Hereafter, it will be clear that, as the retaining means 24 is retracted laterally out of engagement with the balance of the stack, the stack is free to move forward in an axial direction, responsive to an appropriate force, which conveniently may be gravity, until the rim portion of the next article to be dispensed engages the sensing means 28. The laterally retracted stripping means 26 again positions itself according to the position of the sensing means 28 to be ready to shift laterally toward the edge 20 of the stack to coact with the next article to be dispensed and repeat the above cycle of operation.

Advisably, the present invention, in somewhat more detail, includes each of the elements schematically illustrated in FIG. 1. The retaining means 24 may comprise a finger arrangement 30 mounted for shifting laterally toward and from the stack 10 as indicated by the arrow 32. A resilient retaining pad arrangement 34 may be mounted for shifting laterally toward and from the stack as indicated by the arrow 32. One or the other of these two arrangements may be used separately, or they may be used in combination. Similarly, any other suitable arrangement which serves to retain the balance of the stack while articles are being forceably stripped from one end thereof is included within the precepts of this invention.

Additionally, if desired, retaining means 36 may be provided which includes a ledge arrangement 38 adapted to support the bottoms 18 of nested articles in the stack 10. The ledge 38 is mounted for shifting motion laterally toward and from the stack as indicated by the arrow 40 so that it can be retracted beyond the edge 20 of the stack to permit passage of articles being dispensed therefrom. The support means 36 serves as a basic or primary support for the stack as the stack moves forward and while the remainder of the dispensing mechanism is repositioning in preparation for a succeeding cycle of dispensing motion.

The stripping means 26 may comprise a finger arrangement 42 adapted for insertion between the flanged rims of articles 12 in the stack. The finger 42 is mounted for shifting motion laterally of the stack as indicated by the arrow 44. Additionally, the stripping finger 42 is connected to generate longitudinal stripping motion of the article as indicated by the arrow 46. Such longitudinal stripping motion is advisably of an independent nature not followed by the other operating mechanisms of the dispensing arrangement.

The sensing means 28 conveniently may comprise a feeler finger or ledge 48 adapted to engage the leading surface of the rim portions 14 of end articles in the stack. The sensing means 28 is mounted for shifting laterally of the stack as indicated by the arrow 50 so that it can be retracted beyond the edge 20 of the stack to permit passage of articles being dispensed therefrom. Additionally, the sensing means 28 is mounted for longitudinal sensing motion relative to the stack. During each stripping operation, the sensing means 28 is moved longitudinally away from the stack as indicated by the arrow 52. After each dispensing operation, the sensing means 28 is moved longitudinally back toward the stack under the influence of a yieldable motivating force indicated by the arrow 54 which includes a schematic representation of a mechanical spring. The schematic indication of mechanical yieldable motivating means is not to be construed as an exclusive embodiment because it is clear that other yieldable motivators such as hydraulic, pneumatic, electric, gravitational, air-blast and the like may be employed by those skilled in such arts according to the particular requirements of the dispenser.

It will be noted that the arrows 52 and 54 are positioned adjacent a bracket 56 which encompasses the retaining means 24 as well as the stripping means 26 and the sensing means 28. By this it is to be understood that the stripping means 26 is conveniently coupled for longitudinal motion with the sensing means 28 as indicated by the arrows 52 and 54. This sensing motion 54 which the stripping means 26 follows, as noted above, is independent of the longitudinal stripping motion indicated by the arrow 46.

By the inclusion of the retaining means 24 within the bracket 56 it will be understood that means such as the finger 30 are also to follow the longitudinal motion of the sensing means 28 as indicated by the bracket and arrows 52 and 54. However, if retaining means such as the resilient pad 34 is utilized exclusively without means such as the finger 30, it is not necessary that the retaining means be mounted for longitudinal sensing motion as indicated by the arrows 52 and 54.

The particular operating mechanism for providing the above described motions of the dispensing apparatus are not illustrated in detail in connection with purely schematic FIG. 1 because many arrangements are possible and many such arrangements will immediately be evident to those skilled in the art of machine design. Purely by way of suggestion, it will be obvious that the following types of movement may be employed with conventional mechanical, hydraulic, pneumatic, electric or other motivating arrangements. For instance, the stack retaining means 24 may be mounted for shifting laterally inwardly or outwardly of the edge 20 of the stack 10 in accordance with the arrow 32 by rectilinear motion, by rotary motion about a point 58 located outwardly of the edge 20 of the stack, or by a combination of such motions. The sensing means 28 may similarly be mounted for lateral motion in accordance with the arrow 50 by rectilinear shifting, by rotary motion about a point such as the point 60 located outwardly of the edge 20 of the stack, or by a combination of such motions. The stripping means 26 may similarly be mounted for lateral motion in accordance with the arrow 44 by rectilinear shifting, by rotary motion about a point such as the point 62 located outwardly of the edge 20 of the stack, or by a combination of such motions. Additionally, the stripping means 26 may be mounted for longitudinal stripping motion relative to the stack in accordance with the arrow 46 by rectilinear motion parallel with the longitudinal centerline of the stack, by rotary motion about a point such as the point 62, or by a combination of such motions.

The longitudinal sensing motion indicated by the arrows 52 and 54 may conveniently be accomplished by rectilinear motion of the sensing means 28 in a direction in parallel alignment with the centerline of the stack, by oscillating motion about a point such as the point 60, or by a combination of such motions. In any event, the stripping means 26 and, preferably, the retaining means 24 are mounted for shifting in cooperation with the sensing means 28 so that they also follow the longitudinal sensing motion indicated by the arrows 52 and 54. While the longitudinal motion away from the stack in accordance with the arrow 52 is preferably accomplished by conventional positive motivating means such as those employed for the remainder of the motions of the dispensing mechanism, it will be appreciated that the limited longitudinal sensing motion toward the stack in accordance with the arrow 54 is accomplished by a yieldable motivating arrangement. Such an arrangement has sufficient power to move the elements encompassed by the bracket 56 toward the stack until the ledge portion 48 of the sensing means engages the forward or leading surface of the rim 14 of end articles of the stack. Such yieldable motivating means, however, is balanced so that the presence of a rim 14 in engagement with ledge portion 48 of the sensing means will interrupt the longitudinal sensing motion in the direction of the arrow 54. This positions the elements encompassed within the brackets 56 in proper positional relation with articles to be dispensed from the stack so that the dispensing operation may take place.

Finally, it will be clear that the basic support 36 may be mounted for lateral shifting in accordance with the arrow 40 by rectilinear motion, by rotary motion about a point such as the point 64 located outwardly of the edge 20 of the stack, or by a combination of such motions.

In operation, the elements of schematic FIG. 1 may produce the following sequence of motion in a repetitive fashion, each cycle of the apparatus serving to move end articles individually away from a nested stack of such articles. At the beginning of a cycle, the retaining means 24 and the stripping means 26 are shifted laterally outwardly of the edge 20 of the stack 10 in accordance with their respective directional arrows 32 and 44. The stripping means 26 is positioned at the inner limit of its longitudinal stripping motion indicated by the arrow 46. The sensing means 28 is shifted inwardly relative to the edge of the stack 20 in accordance with its directional arrow 50. The retaining means 24, the stripping means 26 and the sensing means 28 are located at the outer limit of their longitudinal sensing motion indicated by the arrow 52. Finally, at the beginning of the cycle the support means 36 is positioned laterally inwardly of the edge 20 of the stack. With the parts in this relationship, it will be clear that the stack 10 will be shifted longitudinally forwardly until the bottom portion 18 of the end article of the stack encounters the ledge portion 38 of the basic support 36.

The first motion of the parts in a cycle which begins with the parts positioned as described immediately above is the inwardly longitudinal sensing motion indicated by the arrow 54. The extent of this motion on each cycle is determined at random by the positional relationship of the flexible rim 14 of the end article relative to the rest of the stack. When the ledge portion 48 of the sensing means 28 engages the rim, the motion of the elements within the bracket 56 in the direction of the arrow 54 is stopped. Thereafter, the four following motions take place. First the stack retaining means 24 and the stripping means 26 are shifted laterally inwardly in accordance with their arrows 32 and 44 to engage the balance of the stack 10 and to engage the rim 14 of the article to be dispensed, respectively. These motions may take place simultaneously or in sequence depending upon design or other requirements. Then, the sensing means 28 and the basic support means 36 are retracted laterally in accordance with their arrows 50 and 40 beyond the edge 20 of the stack out of the path of the end article which is to be dispensed. These motions may take place simultaneously or in sequence, again depending upon the requirements of the particular machine. The next motion in the predetermined cycle is the outward longitudinal shifting of the stripping means 26 in accordance with the arrow 46 to remove the end article from the stack, the balance of which is held by the retaining means 24. At this point an article has been dispensed from a stack.

The final portion of the cycle returns the parts to their original position. First the stripping means 26 is returned to its inward longitudinal position in accordance with the arrow 46. Thereafter, the support means 36 is returned to its inward lateral position preparatory to receiving the entire stack 10 of articles on the next increment of forward motion thereof. At this point, the sensing means and the other elements encompassed within the bracket 56 have been moved outwardly in accordance with the arrow 52, and the retaining means 24 and the stripping means 26 are retracted laterally in accordance with their arrows 32 and 44 beyond the edge 20 of the stack. The retraction of the retaining means 24 permits the balance of the stack 10 to shift forwardly until the bottom portion 18 of the new end article thereof encounters the ledge 38 of the support means 36. Finally, the sensing means 28 is shifted laterally inwardly in accordance with its arrow 50 to complete the cycle of operation.

Merely for the purpose of suggesting one possible operative embodiment of the above invention to those skilled in the art, the following unit 66, a number of which may be located around the end of a stack, is described in complete detail illustrating one possible sequence of function for the described parts.

The preferred actuating mechanism 66 comprises a fixed upper member 68 and a fixed lower member 70 between which the actuating mechanism is mounted. A generally horizontal bar member 72 is mounted adjacent the upper member 68 for guided vertical travel upwardly and downwardly therebeneath. The bar 72 is biased to its upward position against the member 68 by a suitable spring load as at 74, and is power driven downwardly as at 76.

The dispensing mechanism comprises a first or main support means 78 including a retaining ledge portion 80 adapted to support the bottom portions 82 of dished articles 84 arranged in a nested stack. The articles 84 have outwardly flaring rim portions 86 arranged in generally straight but not necessarily evenly spaced longitudinal alignment. The main support 78 is secured to a vertically arranged operating shaft 88 mounted for limited rotary and axial motion between the members 70 and 72. The shaft 88 includes a radially extending follower pin 90 riding on the upper ramp of a fixed circular cam 92 to impart limited axial motion to the ledge portion 80 as the shaft 88 is rotated. A second radially extending follower pin 94 is positioned to ride in a helical cam groove 96 in a sleeve 98 (omitted for clarity in FIGS. 4–8) which is fixed at its upper end at 100 in the shiftable operating member 72 to receive the upper end of the shaft 88 in telescopic fashion so that up and down reciprocation of the operating member 72 and the sleeve 98 imparts oscillatory motion to the shaft 88.

A sensing means 102 comprises a finger or ledge portion 104 adapted to engage the lower side of the rim portion 86 of the lowermost article in the stack. The sensing means 102 is rigidly attached to a vertically arranged operating shaft 105 mounted for limited axial and rotary motion between the members 70 and 72. A radially extending follower pin 106 is positioned to ride in a helical cam groove 108 in a sleeve member 110 fixed at its upper end at 112 to the operating member 72 to telescopically receive the upper portion of the shaft 105. A second radially extending follower pin 114 is positioned to ride on the upper ramp of a circular cam 116 secured to the upper surface of a retaining finger block 118, which loosely surrounds the shaft 105. Oscillatory motion of the shaft 105 imparted by relative vertical reciprocation of the helically grooved cam sleeve 110 results in limited vertical reciprocation caused by the pin 114 riding on the surface of the cam 116.

The retaining finger block 118 slidably positioned on the shaft 105 is L shaped in plan view and contains a lateral slide member 120 including a retaining finger 122 and a cam follower roller 124. The slide member 120 is urged by a spring 126 to its rest position wherein the retaining finger 122 is retracted horizontally or laterally beyond the edge of the vertical stack. The retaining finger block 118 is rigidly attached to the bottom extremity of a stop shaft 128. The upper portion of the stop shaft 128 is slidably received through appropriate bores in the members 72 and 68, and includes a snap ring 130 above the fixed member 68 to limit downward travel of the retaining finger 122, as well as the sensing means 102 through the arrangement of the pin 114 and the cam 116 on the top of the retaining finger block.

A stripping finger block 132 which is also L shaped in plan view contains a lateral slide member 134 which includes a stripping finger 136 as well as a roller cam follower 138. The slide member 134 is urged to a rest position by a spring 140 wherein the stripping finger 136 is retracted horizontally or laterally beyond the edge of the vertical stack. A guide shaft 142 is secured at its upper end to the bottom of the stripping finger block 132, and is mounted at its lower end for vertical sliding movement in a bore 144 in the member 70. Another operating shaft 146 offset from the guide shaft 142 is secured at its lower end to the stripping finger block 132 and is mounted for vertical sliding motion through a fixed block 148. An axially fixed snap ring 150 located on the shaft 146 below the fixed block 148 limits upward travel of the stripping finger block 132. A compression coil spring 152 acting between the fixed block 148 and the upper portion 154 of the operating shaft 146 creates a yieldable motivating force biasing upwardly the stripping finger block 132, the retaining finger block 118 which rides thereon, and the operating shaft 105 for the sensing finger mechanism 102.

To shift the lateral slide members 120 and 134 of the retaining finger block 118 and the stripping finger 132, respectively, horizontally inwardly against their individual spring loads, a vertically reciprocating cam actuator is provided. A yoke member 156 taking the form of an inverted "U" includes an angled cam ramp 158 on one leg thereof and a similarly angled but vertically downwardly offset cam ramp 160 on the other leg thereof. The cam 158 is designed to shift the slide member 134 of the stripping finger block 132 forwardly when downward vertical motion of the yoke 156 causes contact with the roller follower 138. The other cam 160 is designed to shift the slide member 120 of the retaining finger block 118 forwardly when downward vertical motion of the yoke 156 causes contact with the roller follower 124.

A stop member 162 depending downwardly from the web or base portion of the yoke 156 is designed to contact the upper surface of the retaining finger block 118 during a predetermined portion of the operating cycle for a purpose described below.

The yoke member 156 includes an upwardly extending operating shaft 164 fixed thereto. The shaft 164 is telescopically received at its upper end in a depending sleeve 166 which is fixed at 168 to the operating member 72. A compression coil spring 170 acts between the lower portion of the lost motion connection sleeve 166 and the yoke 156 to bias the operating shaft 164 telescopically outwardly of the sleeve 166. A pin 172 extending diametrally through the sleeve 166 is positioned to ride in an axially extending transverse groove 174 in the shaft 164. The pin 172 and slot 174 limit outward telescopic motion of the shaft 164 relative to the sleeve 166 as well as inhibit relative rotary motion between the two to prevent misalignment of the cam yoke 156.

An abutment member 176 fixed to the lower side of the operating member 72 is positioned to engage the upper end 154 of the stripping finger operating shaft 146 midway of the downward travel of the operating member 72.

Figure 2:
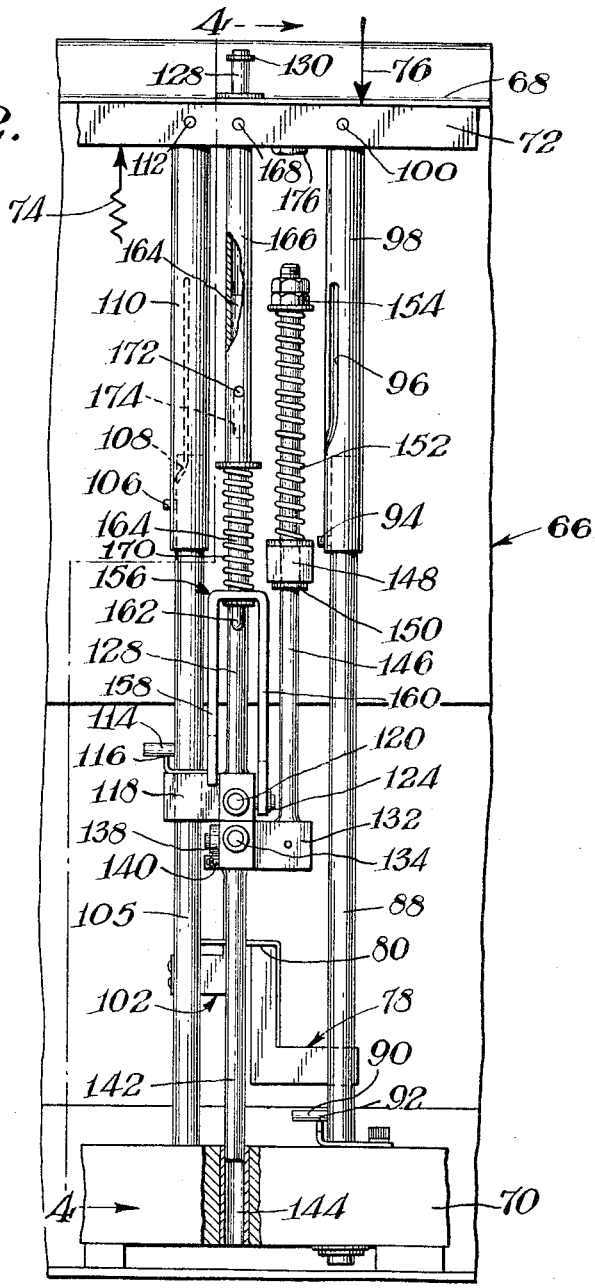
FIG. 2 is an elevational view of the actuating mechanism for a preferred embodiment of this invention.

In operation, each downward and upward reciprocation of the operating member 72 drives the above described dispensing apparatus through one complete cycle of operation to dispense a single tray 84 from the bottom of the stack. Describing first the position of the operating mechanism at the beginning of a cycle, the stack retaining finger 122 and the stripping finger 136 are retracted laterally outwardly of the edge of the stack. As best seen in FIGS. 2 and 4, the ledge portion 80 of the support means 78 is swung laterally inwardly of the edge of the stack and supports the bottom 82 of the dished portion of the lowermost article 84. Essentially the entire weight of the stack of articles is thus supported at the beginning of the operating cycle by the ledge portion 80. Finally, at the beginning of the operating cycle, the sensing means 102 is swung laterally inwardly of the edge of the stack to position its ledge portion 104 beneath the flared rim 86 of the lowermost article 84 in the stack. The sensing means 102 at this point is biased upwardly to contact the rim 86 of the lowermost article by means of the compression coil spring 152 acting from the fixed block 148 through the following mechanism: spring seat 154, operating shaft 146 and the stripping finger block 132 secured thereto, retaining finger block 118, cam 116 on the retaining finger block 118 and the follower pin 114, and operating shaft 105. This positions the retaining finger 122 and the stripping finger 136 longitudinally in proper positional relationship with the rim 86 of the lowermost article 84 in the stack. (In FIG. 2, these elements are shown at the upper limit of their possible longitudinal sensing motion with stop 150 up against block 148; whereas, in FIGS. 4 and 5, they are shown at the lower limit of such possible motion with stop 130 down against member 68.)

As the operating member 72 begins its descent, the cam 160 on the yoke 156 first engages the roller follower 124 of the lateral slide member 120 in the retaining finger block 118 to shift the retaining finger 122 laterally inwardly beyond the edge of the stack to be inserted between the rims of the lowermost article and the second article in the stack (FIG. 5). As this motion is completed, the cam 158 on the yoke 156 contacts the roller follower 138 of the lateral slide member 134 in the stripping finger block 132 to shift the stripping finger 136 laterally inwardly beyond the edge of the stack and also between the rims of the lowermost and the second article in the stack (FIG. 6).

As the stripping finger 136 is being shifted laterally inwardly, the downward motion of the sleeve 110 rotates the operating shaft 105 through the helical cam groove 108 and its associated pin 106 to swing the ledge 104 of the sensing mechanism 102 laterally outwardly beyond the edge of the stack. Additionally, the pin 114 on the operating shaft 105 rides down the ramp of the cam 116 to impart limited downward vertical travel to the ledge 104 as it swings out from beneath the rim 86 of the lowermost article in the stack. Before the stripping finger 136 has completed its inward lateral movement, and after the sensing finger 102 has begun its outward lateral movement, the ledge portion 80 of the main support 78 begins to be retracted. Downward motion of the sleeve 98 serves to rotate the operating shaft 88 by means of the helical cam groove 96 and its associated follower pin 94 to swing the ledge portion 80 laterally outwardly beyond the edge of the stack. Follower pin 90 also rides down the ramp of the fixed circular cam 92 to generate limited vertically downward travel of the ledge portion 80 to swing it downwardly as well as outwardly from beneath the dished portion 82 of the lowermost article in the stack.

When this motion is completed, the entire stack except the lowermost article is supported on the retaining finger 122. The lowermost article is usually frictionally held against falling by its nested dished portion. The weight of the stack on the retaining finger 122 causes the retaining finger block 118 to move downwardly to the limit of its travel as permitted by the snap ring 130 contacting the upper surface of the fixed member 68. The stripping finger block 132 also follows this movement because it is biased upwardly only by the sensing compression spring 152, which has insufficient power to support the full weight of the stack. As the retaining finger block 118 rides downwardly, of course, the laterally retracted sensing finger 102 also moves downwardly therewith by gravitational bias keeping the pin 114 resting on the upper surface of the cam 116.

When the ledge portion 80 of the support means 78 is fully retracted laterally out of the path of the article to be dispensed, the abutment 176 on the lower side of the operating member 72 contacts the upper end of the operating rod 146 which is thereafter driven downwardly with the operating member 72. Spring 152 is compressed by this motion, and the stripping finger block 132 is shifted downwardly away from the retaining finger block 118 (FIG. 7). This causes the stripping finger 136 to separate the lowermost article in the stack from the balance of the stack supported on the retaining finger 122. Just after such stripping motion begins, abutment member 162 on the yoke 156 engages the upper surface of the retaining finger block 118 which, as mentioned above, is held against further downward travel by the snap ring 130 on the upper end of the operating shaft 128.

The final increment of downward travel of the operating member 72 thus imparts no further motion to the cam yoke 156, such lost motion connection being taken up by compression of the spring 170 and shifting of the pin 172 to the bottom of its cooperating slot 174. Thus, the final portion of the downward travel of the stripping finger block 132 serves to move the roller follower 138 downwardly relative to its now stopped cam 158 to permit the spring 140 to retract the stripping finger laterally outwardly beyond the edge of the stack (FIG. 8). Such retracting of the stripping finger as its undergoes its final increment of longitudinal stripping motion insures that articles are released therefrom if, by chance, the finger had accidentally punctured or otherwise engaged the rim of the article being dispensed in a manner which caused the article to adhere to the finger.

After the operating member 72 has reached the bottom extent of its reciprocating travel (FIG. 3) and begins upward return motion, the foregoing sequence of operation is essentially reversed, and proceeds as follows. Spring 152 biases the stripping finger block 132 upwardly following the retraction of the abutment member 176. This causes the roller follower 138 on the slide member 134 to engage the inclined ramp of still stationary cam 158 and again extend the stripping finger 136 laterally inwardly as it moves up. After the stripping finger 136 has been cammed inwardly, the lost motion connection between the pin 172 and the slot 174 is taken up to nullify the action of the spring 170, and the yoke 156 and its two associated cams thereafter move upwardly concurrently with the operating member 72. When the stripping finger block 132 has moved upwardly into contact with the lower surface of the retaining finger block 118 it is held in this position, and the abutment member 176 separates from the end 154 of the operating rod 146. The stripping finger block 132 is thus held at the lower extent of longitudinal sensing motion by the presence of the retaining finger block 118 which in turn is supporting the entire weight of the balance of the stack.

At this point, the main support means 78 has started to swing laterally inwardly beyond the edge of the stack through the action of the helical cam groove 96 and its associated pin 94. Next, the sensing finger mechanism 102 begins to swing laterally inwardly beyond the edge of the stack by coaction of the pin 106 with its ascending helical cam groove 108 while the inclined cam 158 on the yoke 156 begins to allow retraction laterally outwardly beyond the edge of the stack of the stripping finger 136. By the time the main support 78 and the sensing finger 102 have been oscillated fully to their inner position, the cam 158 has been elevated to the point where the stripping finger 136 is fully retracted laterally outwardly of the edge of the stack. As the main support 78 and the sensing means 102 are rotated inwardly, of course, they are elevated slightly by their respective vertical cam arrangements 90, 92 and 114, 116. Finally, the last increment of upward retraction of the operating mechanism 72 withdraws the inclined cam 160 from the roller follower 124 allowing retraction laterally outwardly of the retaining finger 122.

When the retaining finger 122 is retracted, the entire stack of articles 84 settles by gravity until the bottom 82 of the lowermost dished article contacts the ledge portion 80 of the support means 78. At this point, the sensing finger 102, as well as the stripping finger 136 and retaining finger 122 which follow it, are at the lower extent of their longitudinal sensing motion as defined by the snap ring 130 resting on the member 68. If the flanged rim 86 of the new lowermost article in the stack is warped slightly upwardly beyond a midposition, the action of sensing spring 152 generates upward sensing motion of the sensing finger 102 by means of the stripping finger block 132 and the retaining finger block 118. When the ledge portion 104 of the sensing finger 102 contacts the flanged rim of the lowermost article, such upward motion is stopped because, it will be remembered, the spring 152 has insufficient power to support the entire weight of the stack. This positions the retaining finger 122 and the stripping finger 136 longitudinally adjacent the rim of the lowermost article irrespective of distortion or warpage of such rim, because these two fingers have floated upwardly in fixed relation to the finger or ledge portion 104 of the sensing means 102. At this point, the entire cycle of operation is complete, the lowermost article of the stack having been stripped downwardly therefrom and the parts having repositioned themselves adjacent the flexible flanged rim of the new lowermost article preparatory to repeating the above cycle of operation.

Thus, a dispensing arrangement has been disclosed which determines the longitudinal positions of irregular or flexible rims of articles to be dispensed relative to a nested stack of such articles. Thereafter, the rims are acted upon by stripping means responsive to such positional determination to remove the articles from one end of the stack.

While the above described embodiments constitute preferred modes of practicing this invention, other embodiments and equivalents may be resorted to within the scope of the actual invention, which is claimed as follows.

What is claimed is:

1. An arrangement for dispensing articles from one end of a stack thereof, the articles being of the type having lateral rim portions, comprising means for holding a longitudinal stack of such articles with their rim portions in generally straight but not necessarily uniformly spaced longitudinal alignment defining an edge of the stack, dispensing means connected to remove articles individually from one end of a stack in the holding means including article stripping means mounted for lateral shifting into and out of operative engagement with the edge of the stack and for independent longitudinal travel away from and back to the end of the stack to remove end articles individually away from the stack, stack retaining means mounted for lateral shifting into and out of operative engagement with the edge of the stack, and sensing means connected to locate the end articles to be removed and properly position the article stripping means and the stack retaining means longitudinally with respect to the rim portions thereof including sensing finger means mounted for lateral shifting independently of the article stripping means and the stack retaining means into and out of operative engagement with the edge of the stack, means mounting the sensing finger means, the article stripping means and the stack retaining means for travel in a limited longitudinal range adjacent the end of the stack, yieldable motivating means connected to urge the sensing finger means within the range longitudinally toward the stack until the sensing finger means engages the end articles to be removed, follower means connecting the article stripping means and the stack retaining means with the sensing finger means to properly position them with respect to the rim portions of the end articles when the sensing finger means has engaged the end articles, and drive means connected to first shift the sensing finger means laterally into operative engagement with the edge of the stack and the article stripping means and stack retaining means laterally out of operative engagement with the edge of the stack, the yieldable motivating means urging the sensing finger means into engagement with end articles, next shift the article stripping means and the stack retaining means laterally into operative engagement with the edge of the stack, the follower means properly positioning them with respect to the rim portions of end articles, then shift the sensing finger means laterally out of operative engagement with the edge of the stack to permit removal of end articles individually therefrom, thereafter cause independent longitudinal travel of the article stripping means away from the stack to remove end articles individually therefrom and, finally, cause independent longitudinal travel of the article stripping means back to the end of the stack to complete an article dispensing sequence.

2. An arrangement for dispensing articles as in claim 1 including means connected to shift the sensing finger means longitudinally away from the stack within the range by the time it is shifted laterally into operative engagement with the edge of the stack so as to permit the yieldable motivating means to urge it longitudinally toward the stack until it engages end articles.

3. An arrangement for dispensing articles as in claim 2 including means connected to prevent lateral shifting of the sensing finger means while the article stripping means and the stack retaining means shift laterally into operative engagement with the edge of the stack.

4. An arrangement for dispensing articles as in claim 3 wherein the yieldable motivating means is connected to urge the sensing finger means within the range longitudinally toward the stack in a straight path parallel with the edge of the stack.

5. An arrangement for dispensing articles as in claim 4 wherein the yieldable motivating means includes a mechanical spring connected to exert a relatively constant effective force throughout the limited longitudinal range of sensing finger travel.

6. An arrangement for dispensing articles as in claim 4 wherein the follower means includes one-way mechanical abutment connections between the sensing finger means, the article stripping means and the stack retaining means.

7. An arrangement for dispensing articles as in claim 4 further including stack support means mounted for lateral shifting into and out of operative engagement with articles at one end of the stack, and the drive means is connected to shift the stack support means laterally into operative engagement before the yieldable motivating means urges the sensing finger means toward the stack and shift it laterally out of operative engagement before the independent longitudinal travel of the article stripping means away from the stack.

8. An arrangement for dispensing articles as in claim 7 wherein the drive means includes means connected to impart to the stack support means an increment of motion longitudinally toward the stack during shifting thereof laterally into operative engagement with articles at the one end of the stack.

9. An arrangement for dispensing articles as in claim 7 wherein the drive means includes means connected to impart to the article stripping means an increment of lateral outward shifting near the terminus of the independent longitudinal travel away from the stack to insure disengagement from articles removed from the stack.

10. An arrangement for dispensing articles as in claim 7 wherein the drive means includes means connected to shift the sensing finger means and the stack support means laterally out of operative engagement with the stack substantially simultaneously.

References Cited by the Examiner

UNITED STATES PATENTS

| 2,489,096 | 11/1949 | Lime | 221—223 |
|---|---|---|---|
| 2,941,693 | 6/1960 | Matteson | 221—92 |
| 2,974,828 | 3/1961 | Matteson | 221—221 |
| 2,993,621 | 7/1961 | Mumma | 221—210 |
| 3,032,237 | 5/1962 | Erickson | 221—223 |
| 3,165,233 | 1/1965 | West | 221—221 |

ROBERT B. REEVES, *Primary Examiner.*

KENNETH N. LEIMER, *Examiner.*